United States Patent [19]

Haverdink et al.

[11] 4,192,386
[45] Mar. 11, 1980

[54] MATERIAL CONVEYOR

[75] Inventors: Virgil D. Haverdink; Henry J. Landry, Jr., both of Ankeny, Iowa

[73] Assignee: Deere & Company, Moline, Ill.

[21] Appl. No.: 947,182

[22] Filed: Sep. 29, 1978

[51] Int. Cl.² ............................................. A01D 17/16
[52] U.S. Cl. ........................................ 171/58; 15/3.11
[58] Field of Search ...................... 171/50, 53, 55–62, 171/84; 198/510–513; 15/3.11; 209/241, 669

[56] References Cited

U.S. PATENT DOCUMENTS

| 2,960,813 | 11/1960 | Jones | 56/106 |
|---|---|---|---|
| 3,451,084 | 6/1969 | Silver | 15/3.11 |
| 3,747,149 | 7/1973 | Tatyanko et al. | 15/3.11 |
| 3,750,211 | 8/1973 | Zaun et al. | 15/3.11 |
| 3,792,733 | 2/1974 | Crandall et al. | 171/58 |
| 4,024,920 | 5/1977 | Haverdink | 171/58 |
| 4,049,058 | 9/1977 | Eisenhardt et al. | 171/58 |

*Primary Examiner*—Russell R. Kinsey

[57] ABSTRACT

A roll conveyor having paired counter-rotating grab rolls includes a reversing roll section on one grab roll for discharging material conveyed along it perpendicularly to the axes of rotation of the paired rolls. One roll of each pair is composed of separate conveying and discharge or reversing sections that are rotatable about a common axes and in opposing directions. The reversing section is provided at one end of the roll conveyor and cooperates with the other rolls at that end to tumble material transversely from the conveyor. The non-reversing rolls adjacent the reversing section are further provided with helical flightings of opposite hand that meet midway along the reversing section to gather material for sideways discharge.

7 Claims, 3 Drawing Figures

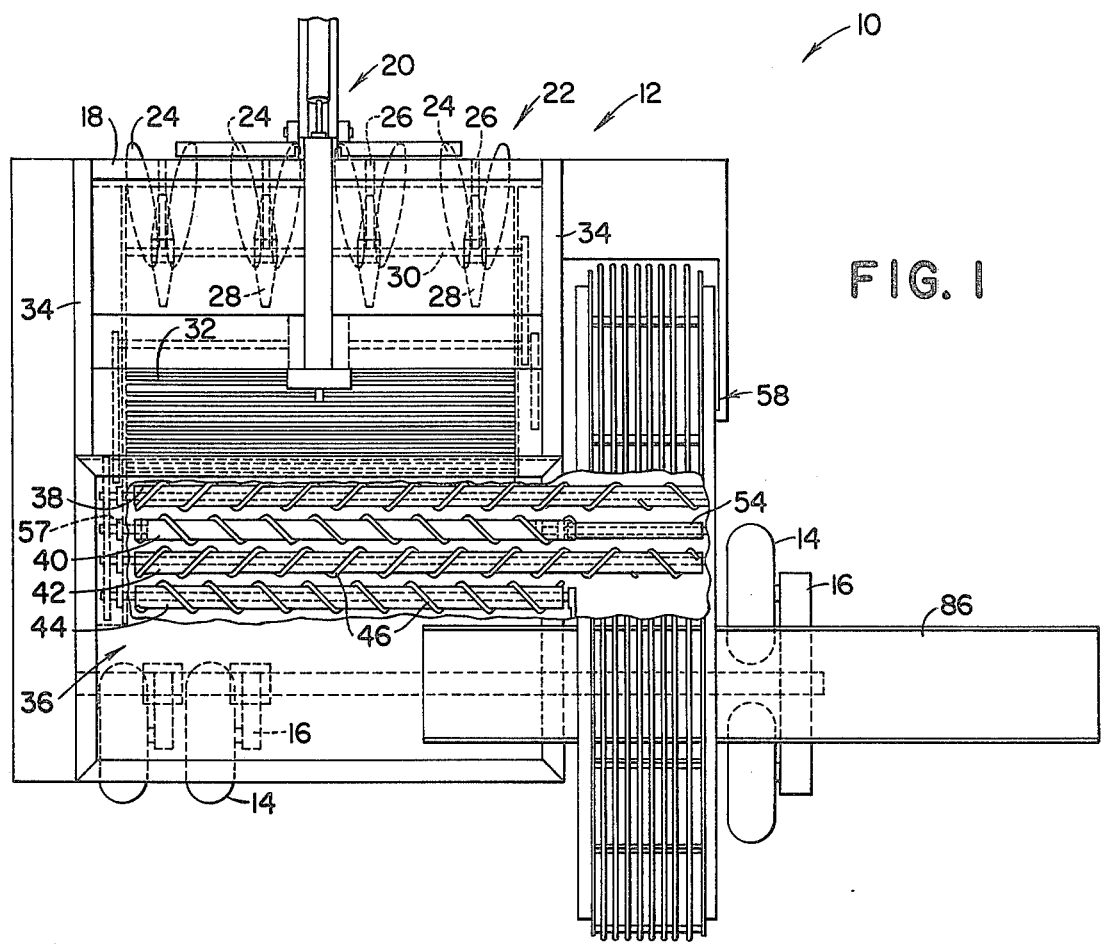
FIG. 1
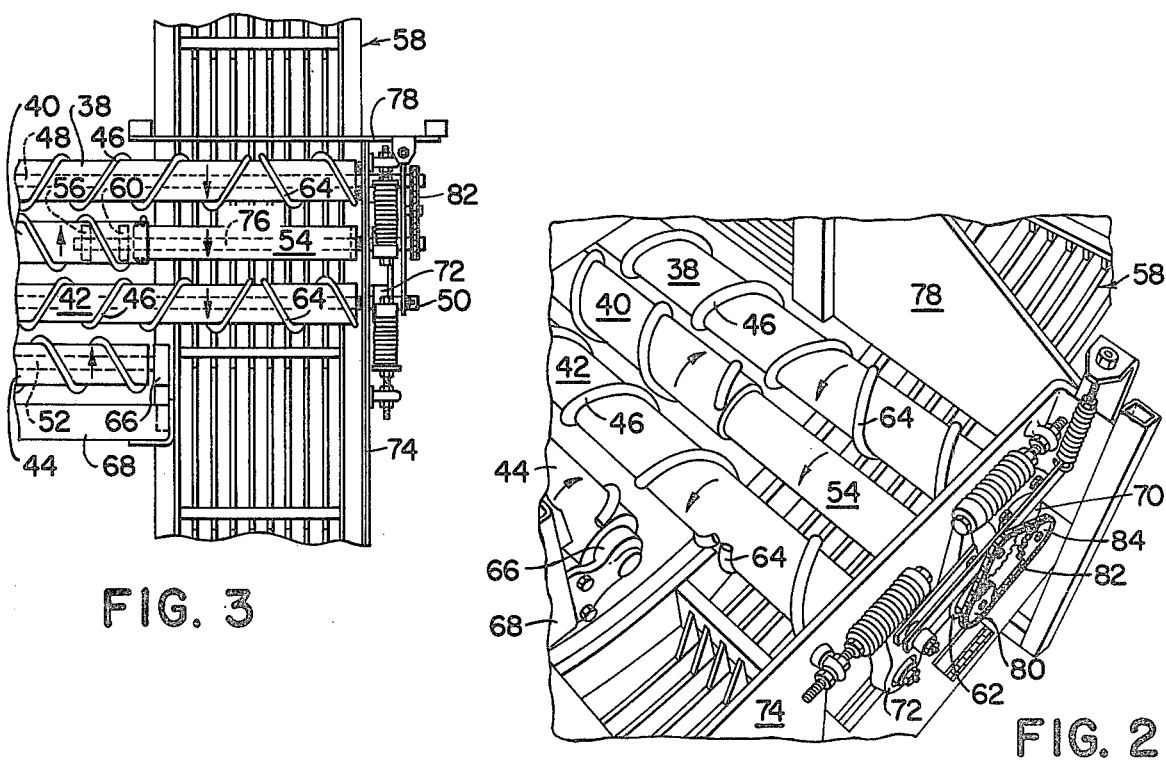
FIG. 3
FIG. 2

4,192,386

MATERIAL CONVEYOR

BACKGROUND OF THE INVENTION

The present invention relates generally to agricultural harvesters and more particularly relates to root crop harvesters.

Conventional beet harvesters include a plurality of beet-conveying structures for receiving the beets from the digger lifter wheels, scrubbing and tumbling them to remove dirt and foreign material and then elevating them for delivery into a holding tank or truck moving alongside the harvester. Typically included among such conveying structures are chain, star wheel and grab roll conveyors.

Grab roll conveyors are preferred over chain or star wheel conveyors for many applications since they are more reliable and less expensive to operate and maintain. Further, in clay-type mud conditions chain conveyors are not as effective as grab roll conveyors in removing the clay that clings to the beets. Star wheel conveyors which generally do a better job of breaking up the clay often damage the beets. It would therefore be preferable to utilize a grab roll conveyor on a beet harvester whenever possible. However, when beets contaminated with clay or similar muds are processed on grab roll conveyors, the mud, weeds and beet tops that often cling to the beets collect around the bearings and bearing supports at the discharge end of the grab rolls. Consequently, the flow of the beets over the ends of the grab rolls has to be slowed and occasionally stopped to clean the foreign materials from the bearings and their supports.

A further problem encountered with grab roll conveyors arises from the flow pattern of beets between separate conveyors. Beets flow from one conveyor to the next by tumbling from the end of the first conveyor onto the front of the next conveyor. This arrangement requires substantial structural framework and reduces the compactness of the harvester. Accordingly, the harvester is often difficult to maneuver and transport, does not have its weight centered between its support wheels and can cause wheel slippage as well as side draft when towed.

SUMMARY OF THE INVENTION

It is therefore an object to provide a root crop harvester having a roll-type conveyor which overcomes these problems.

To minimize plugging of the bearings and the bearing supports at the discharge end of the roll conveyor, there is provided a reversing roll arrangement which discharges the beets from the side of the roll conveyor rather than over the end of the conveyor. The improved conveyor is comprised of paired counter-rotating rolls which move beets along their length and near the end of the conveyor, one roll of each pair of cooperating rolls is provided with a separate roll section which rotates in the same direction as the other roll of the pair. Thus, all rolls of the conveyor at its discharge end rotate in the same direction and discharge the beets transversely to the roll length. Beets laden with clay or other foreign materials do not pass over the bearings or the supports and cannot contaminate or plug the bearings to reduce the bearing life.

To further aid in assuring transverse discharge, the paired rolls are provided with spiral flightings having leads that are reversed at the reversing roll area. As the roots or beets are conveyed toward the reversing roll area, they are tumbled back toward the receiving area of the grab rolls into the oncoming roots and therefore collect at the reversing area to be discharged in the direction of rotation of the rotating rolls.

The reversing roll arrangement further eliminates the need for an additional cross conveyor at the end of the roll conveyor. As a result, the harvester is more compact and has its weight better distributed. The maneuverability is improved and transport and storage is simpler. Less wheel slippage will occur in muddy or wet field conditions and better draft control is provided.

BRIEF DESCRIPTION OF THE DRAWINGS

FIG. 1 is a plan view of a root crop harvester incorporating the preferred embodiment of the invention.

FIG. 2 is an enlarged perspective view of the reversing roll and beet discharge area of the roll conveyor shown in FIG. 1.

FIG. 3 is an enlarged and partial plan view of the implement in FIG. 1 showing the reversing roll with the bearing supports for the reversing roll illustrated.

DESCRIPTION OF THE PREFERRED EMBODIMENT

Referring now to the drawings, the beet harvester illustrated is essentially identical to that harvester shown and described in U.S. Pat. No. 4,024,920 issued May 24, 1977 and reference may be had to that patent for additional detail of features not important for purposes of the present invention.

The beet harvester 10 includes a main supporting framework 12 carried on left and right pairs of ground-engaging wheels 14. The wheels 14 are mounted on axles which are carried in support members 16 connected with the framework 12. The forward transverse beam 18 of the frame is supported by a hitch structure shown fragmentarily at 20 in FIG. 1. The hitch structure 20 is adapted in a conventional manner for connection to the drawbar of a tractor and would be provided with means for adjusting its vertical position relative to the frame to thereby adjust the height of the forward end of the harvester 10 relative to the ground.

Carried beneath the front of the transverse frame member 18 and movable therewith as the hitch 20 is adjusted are a plurality of transversely spaced digger wheel units 22. Each unit 22 is composed of a pair of digger wheels 24 which are rotatably supported on opposite sides of a vertical standard 26 that depends from the front transverse member 18. Rearwardly of each digger wheel unit 22 is a paddle wheel 28. The paddle wheels 28 extend between the upper spaced apart portions of their respective digger wheels 24 to engage the beets lifted by the digger wheels 24 and shift them rearwardly. The paddle wheels 28 are rotatably supported on a transversely extending shaft 30 and are adapted for transverse adjustment with their associated digger wheel units 22.

The beets are deflected by the respective paddle wheels 28 to the chain conveyor 32 which extends laterally between the side members 34 of the framework. The beets are conveyed rearwardly by the chain conveyor 32 and deposited on a second conveyor 36 that extends transversely across the harvester 10. This second conveyor 36 is comprised of cooperating and counter-rotating paired grab rolls 38 and 40, and 42 and 44. Each roll includes a cylindrical tube with spiral flightings 46 secured to the outer surface. Supporting the tubes of each roll 38, 42 and 44 and extending centrally throughout to opposite ends are respective shafts 48, 50 and 52. The shafts are rotatably supported in conventional bearings at their opposite ends. The shaft of roll 40, having the reversing section 54, does not extend throughout its tube. That tube rotates at its end adjacent the reversing section 54 about the bearing 56 schematically illustrated in FIG. 3 and about similar bearing supports at its beet-receiving end 57. The rolls of this second conveyor 36 as well as the other operating components of the harvester are powered through the tractor PTO in a conventional manner and for purposes of the present invention are not illustrated or discussed.

As the rolls are rotated, the beets are conveyed along the trough formed between each pair of counter-rotating rolls. The flightings 46 on each roll act to tumble, scrub and advance the beets toward the wheel elevator 58 carried at the right side of the harvester 10, see FIG. 1. As they are tumbled, dirt, clay and other foreign materials are removed and fall between the rolls to the ground.

The beets are discharged from the side of the transverse roll conveyor 36 and into the wheel elevator 58. To provide sideways discharge, the conveyor 36 includes the reversing roll section designated by the number 54. The reversing roll 54 is mounted coaxially with the conveying roll 40 and is supported by bearings 60 and 62 which permit it to be rotated in a direction opposite to that of its coaxially mounted conveyor roll 40. As beets are conveyed between the paired rolls 38 and 40, and 42 and 44, and reach the discharge area above the wheel elevator 58, the rolls 38 and 42 will rotate in the direction illustrated by the arrows. The reversing roll 54 will be driven in the same direction to tumble the beets toward the rear portion of the machine and off the conveyor 36.

The adjacent conveyor rolls 38 and 42 are provided with reversed lead flightings 64 that act to reverse the transverse movement of the beets along the conveyor 36. The reversing roll 54 is provided with a smooth surface to permit the reversed flightings 64 on the adjacent rolls 38 and 42 to tumble the beets rearwardly. If desired, flightings could be provided on the reversing roll 54 to aid in tumbling the beets over it. With the reversing roll action and the reverse lead flighting, transverse movement of the beets being conveyed along the trough between the rolls will be stopped and fore-and-aft rearward tumbling movement will be initiated.

Supporting the end of the grab roll 44 is a bearing 66 that is carried forwardly of and by the frame structure 68. This roll 44 terminates at the inside edge of the wheel elevator 58 to permit beets conveyed along the trough formed between it and its adjacent roll 42 to drop into the wheel elevator 58.

The bearings 70, 62 and 72 and their supports for the respective grab rolls 38, 54 and 42 are spaced to the outside of the upstanding plate 74. Their respective shafts 48, 76 and 50 extend through the plate 74. As the beets are thus conveyed to the end of the roll conveyor 36, the plates 74 and 78 will act to collect the beets and prevent mud and other foreign material from plugging the bearings or their supports.

Driving the sprocket 80 fixed to the shaft 76 of the reversing roll 54 is a chain 82 which is coupled with the sprocket 84 that is fixed to the shaft 48 of the roll 38 paired with it. That shaft 48 is powered at its other end through a chain sprocket arrangement that is powered initially as are all the harvester operating components by the PTO shaft of the tractor.

After the beets have been elevated by the wheel elevator 58, they are discharged onto a cross conveyor 86 outlined generally in FIG. 1. The cross conveyor 86 would be adapted to deliver the beets transversely inwardly to a storage tank that is generally carried on the top of the harvester 10 or transversely outwardly to a truck traveling alongside the harvester 10 for subsequent delivery to a separate storage site.

We claim:

1. In a root crop harvester having a mobile frame; a root-digging means carried by the frame, an elevating means carried by the frame, and an improved conveyor means carried by the frame for receiving roots lifted by the digging means and conveying said roots towards the elevating means comprising: a pair of elongated roll means rotatable about longitudinal axes and disposed to form a root-conveying trough therebetween, one roll means including a conveying section and a discharge section, said sections mounted for rotation in opposite directions; and means for rotating the conveying section and the other roll means in opposing directions and the discharge section in the same direction as said other roll means.

2. The invention defined in claim 1 wherein the conveyor means includes a second pair of roll means adjacent the first pair, said second pair being rotatable about longitudinal axes and disposed to form a root-conveying trough therebetween, the roll means of said second pair that is furthest spaced from the first pair of roll means having an end terminating inwardly spaced from the ends of its paired roll means; and means for rotating said second pair of roll means in opposing directions, with the roll means of said second pair closest the first pair of roll means being rotated in the same direction as said other roll means of said first pair of roll means.

3. An improved elongated material conveyor means adapted to receive material near its one end, convey the material substantially along its length and discharge the material from one side spaced from its one end comprising: first and second roll means adapted for rotation about respective longitudinal axes and disposed to form a material-conveying trough therebetween, the first roll means having first and second roll sections adapted to rotate in opposing directions, said first roll section being at the one end of said roll means and the second section being spaced from said one end; and means rotating the first roll section of the first roll means and the second roll means in counter-rotating directions and the second roll section in the same direction as said second roll means.

4. The invention defined in claim 3 wherein the respective diameters of the outer surfaces of the first roll section of the first roll means and the second roll means are substantially the same and the diameter of the outer surface of the second roll section of the first roll means is less than the aforesaid diameters.

5. An improved root conveyor comprising: first and second root-conveying rolls mounted for rotation about longitudinal axes and disposed so as to form a root-conveying trough therebetween, the first conveying roll having one end terminating inwardly spaced from one outer end of said second roll; a third root-conveying roll disposed to form a root-conveying trough with said second roll, the axis of said third roll being substantially aligned with the axis of said first roll, and the ends of said third roll terminating respectively adjacent the inwardly spaced end of said first roll and the outer end of said second roll; and means for rotating the first and second rolls in opposite directions and the third roll in the same direction as said second roll.

6. An improved root conveyor comprising: first and second adjacent grab rolls mounted for rotation about longitudinal axes, said rolls forming a root-conveying trough therebetween, said first roll composed of a first material-receiving section and a second material-discharging section adapted to rotate in opposing directions about the same longitudinal axis; first and second spiral flightings fixed to and encircling the second roll, said flightings being of opposite hand and extending respectively towards each other and terminating adjacent each other opposite of said second section; and means for rotating the second roll and first section of the first roll in counter-rotating directions and the second section of said first roll in the same direction as said second roll.

7. The invention defined in claim 6 wherein the first roll has spiral flightings fixed to and encircling it, said flighting being of opposite hand to the flighting on the second roll.

* * * * *